Nov. 14, 1944.                M. W. GAISER                 2,362,691
                             CONDENSER TESTER
                          Filed July 31, 1941          3 Sheets-Sheet 3

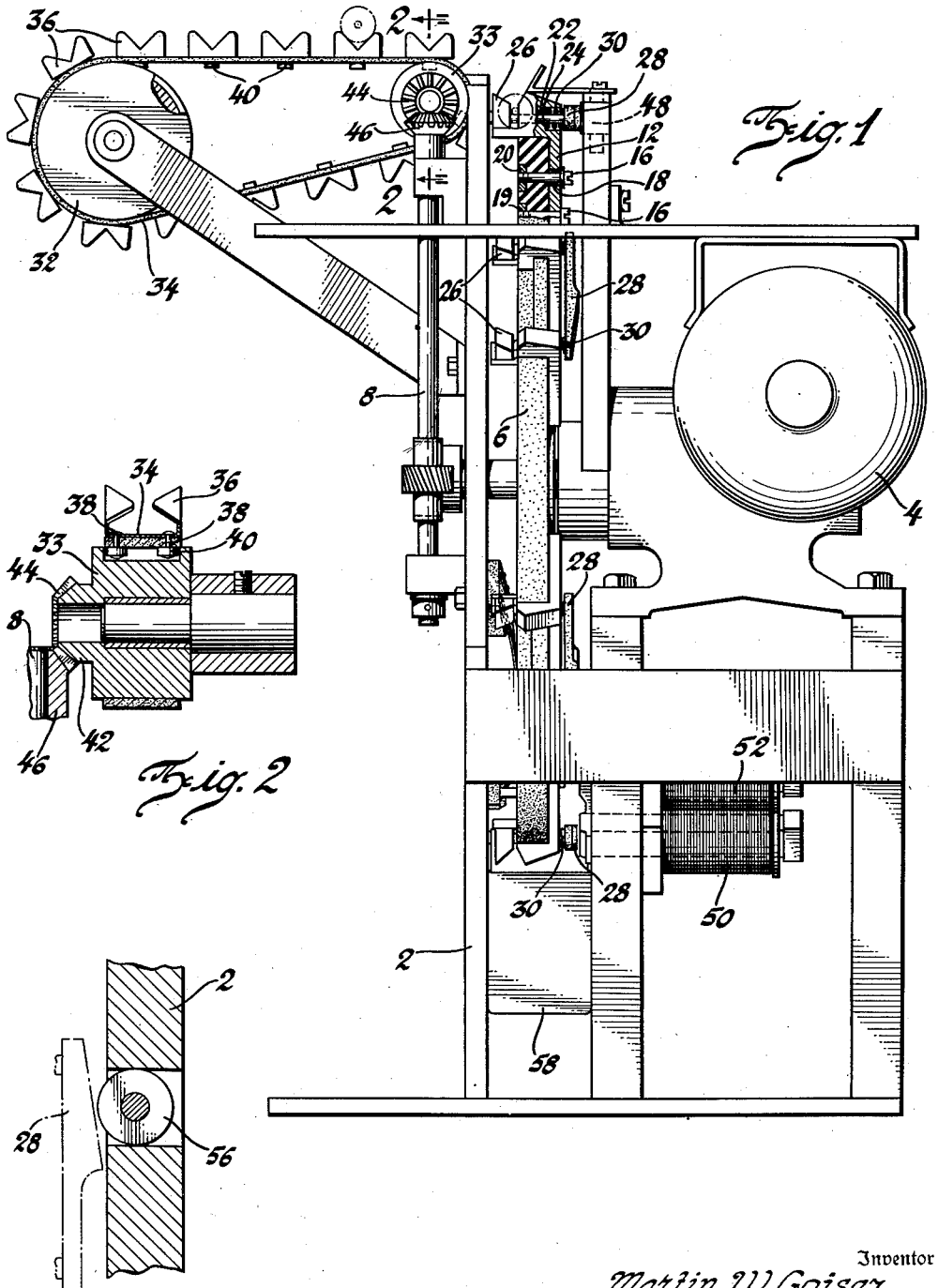

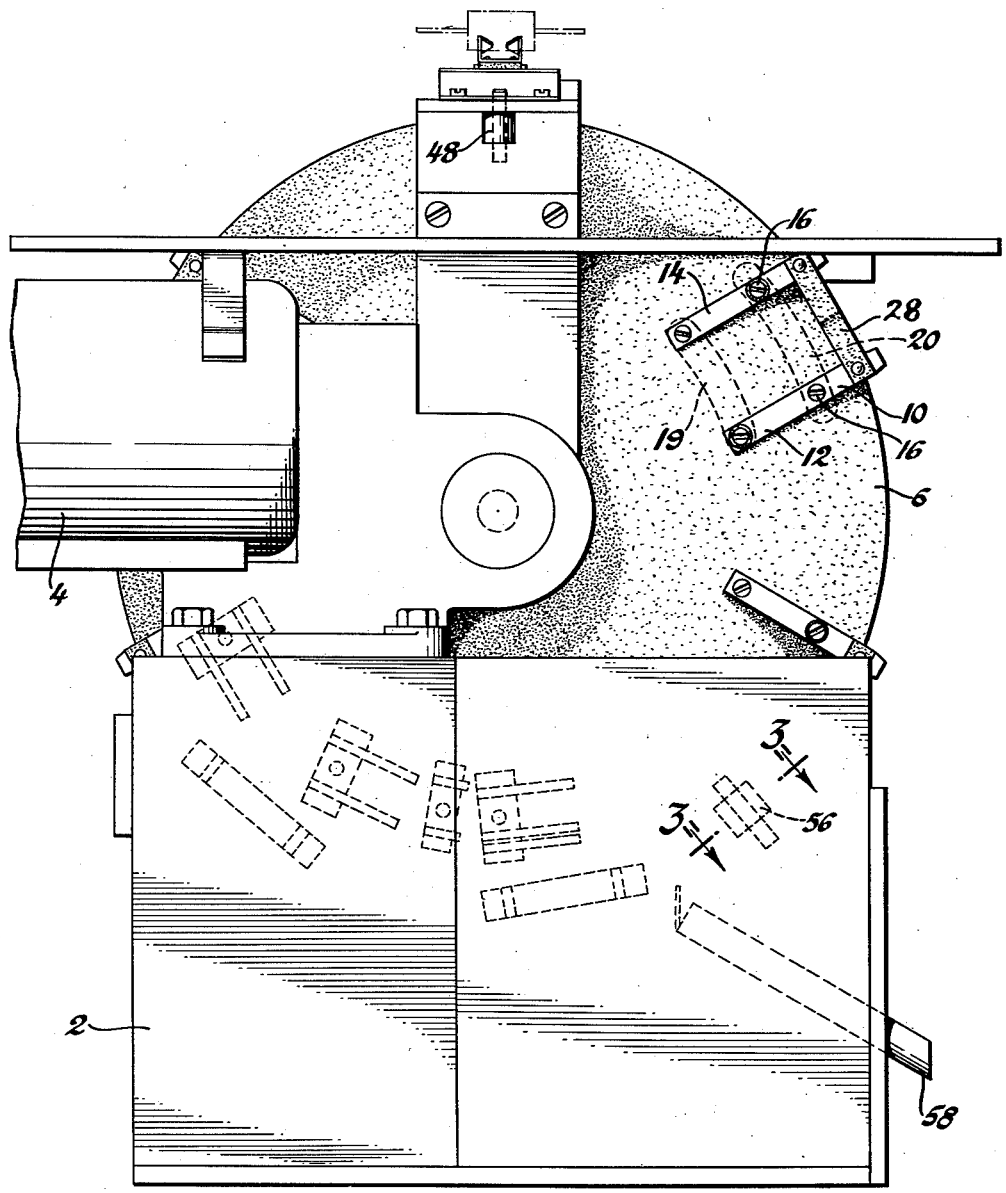

Inventor
Martin W. Gaiser
By Blackmore, Spencer & Flint
Attorneys

Patented Nov. 14, 1944

2,362,691

UNITED STATES PATENT OFFICE 2,362,691

CONDENSER TESTER

Martin W. Gaiser, Kokomo, Ind., assignor to General Motors Corporation, Detroit, Mich., a corporation of Delaware Application July 31, 1941, Serial No. 404,825

7 Claims. (Cl. 209—81)

This invention relates to testing means and more specifically to means for automatically applying a series of tests to condensers to ascertain wether they are satisfactory for a particular usage. In the manufacture of devices in large quantities, such as, for example, radio receivers, it is of course necessary to make a final check of condensers before they are applied to the chassis in production and it is necessary at this time to apply several tests thereto. There are a number of these fixed condensers used in each unit and therefore it is almost essential to have automatic machinery to test these in order to maintain a sufficient speed to keep up with production of the receivers.

It is therefore an object of my invention to provide means for fully automatically testing fixed condensers.

It is a further object of my invention to automatically apply a series of tests to such condensers.

It is a still further object of my invention to automatically apply a series of tests to fixed condensers and have the unsatisfactory or faulty condensers discharged at such point as they fail to pass the tests.

It is a still further object of my invention to provide means for automatically collecting the satisfactory condensers which have passed all the tests at the end of the test cycle.

It is a still further object of my invention to provide automatic means for testing fixed condensers which may be adjusted to accommodate a large variety of types of condensers.

With these and other objects in view, the embodiments of my invention will be best understood by reference to the following specification and claims and the illustrations in the accompanying drawings, in which:

Figure 1 is a side elevation of a device embodying my invention;

Figure 2 is a detailed section taken on line 2—2 of Figure 1;

Figure 3 is a detailed sectional view taken on line 3—3 of Figure 4;

Figure 4 is a front view of the machine embodying my invention; and

Figure 5:
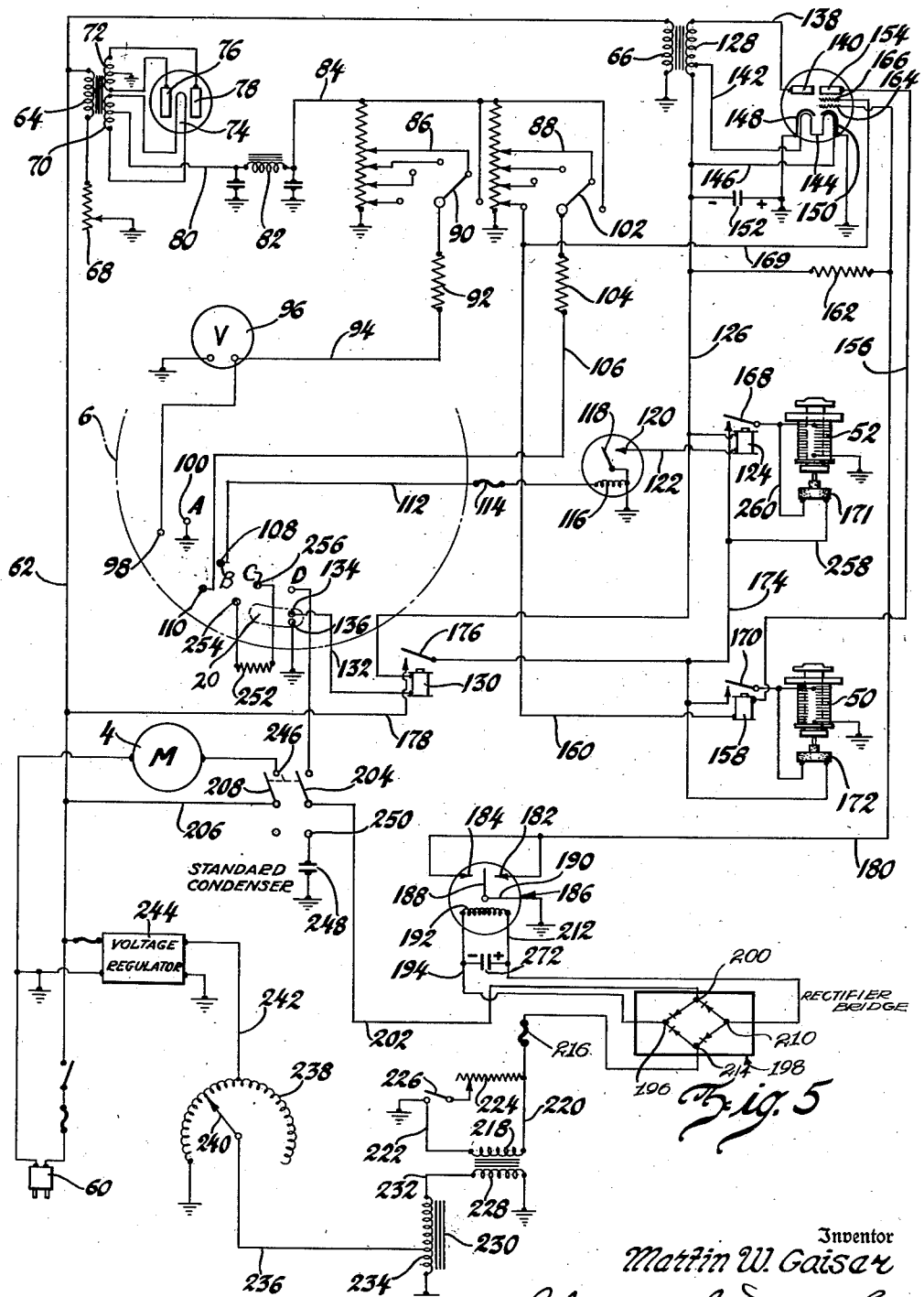
Figure 5 is a schematic wiring diagram showing the electrical connections necessary for the machine.

Referring now specifically to Figure 1, there is shown a supporting frame 2 upon which is mounted a driving motor 4, which, through suitable gearing, is connected to a rotatable vertical disc 6 and also a spaced vertical shaft 8. The disc 6 is made of insulating material and carries at regularly spaced intervals around the periphery thereof a series of clamping means 10 to support the condensers to be tested. These clamping means are arcuately spaced around the periphery of the disc 6 and are composed of a plurality of spaced bars 12 and 14. These bars 12 and 14 are positioned substantially radially of the disc but have L-shaped extensions which extend over the periphery of the disc, as best shown in Figure 1, and are secured to the disc by having bolts such as 16 which go through the L-shaped members 12 and 14 and are threaded into arcuate contacts 20 or 19 in such a manner that one of the side bars 14 is connected to one arcuate contact and the other side member 12 is connected to the other arcuate contact conductively, but the two are insulated from each other. In other words, the alternate bolts are insulated from the bar which it is desired to isolate therefrom. This is best shown in the upper right-hand corner of Figure 4 where two bolts are shown directly connected to the side bars 12 and 14 and the alternate two are shown with an insulating collar 18 therearound. Thus when a condenser is dropped between the clamping portions, one terminal will be connected to one arcuate contact and the opposite terminal will be connected to the other arcuate contact.

Through the upstanding edge of the member 12 is an axially extending hole 22 through which a pin 24 projects and to the end of said pin there is rigidly secured a clamping block 26, the opposite end of the pin carying one end of a lever 28 which extends between the two pins of members 12 and 14 for any one clamping assembly. Between said lever and the back face of the member 12 there is provided a spring 30 which tends to keep the clamping block 26 against the front face of the members 12 and 14. Each of the clamping stations is identical, and, as before mentioned, the same are spaced peripherally about the disc.

The frame 2 also carries a plurality of spaced rotatable wheels 32 and 33 around which is driven an endless belt 34 which carries a plurality of spaced carrier members 36 which in this instance are best shown in detail in Figure 2 as being a bracket bent up at both ends and providing a V-shaped notch in the center to accommodate a fixed condenser. These are riveted by small rivets 38 to the endless belt 34 which carry on their lower ends small rotatable guide wheels 40 to keep the belt on the driving wheels. The wheel 33 has one end of the hub thereof of small diameter, as shown at 42, which has the outer face beveled and toothed to form a beveled gear 44 which cooperates with and is driven by the beveled gear 46 on the upper end of the shaft 8. It will thus be evident that as the motor 4 rotates, the disc 6 will be rotated, and at the same time the shaft 8 will drive the endless feeding carrier and the various carriers 36 will deposit condensers to be tested at the upper edge of the disc 6.

As each one of the clamping asemblies rotates to the uppermost position, the lever 28 thereof will engage a small vertical roller 48 mounted on the frame which will depress it toward the left in Figure 1, thus causing the pair of clamping jaws on the two members 14 and 12 of that particular assembly to move out and allow the terminals of the condensers to be tested to go down between the movable jaw and the stationary portion, and as the disc 6 continues to rotate, the compression springs 30 will clamp the condenser tightly in place and at the same time connect it electrically to the two arcuate contacts 19 and 20. The spacing of the clamping assemblies 10 and of the carriers 36 is such that as each carrier 36 reaches a position in which it discharges the condenser which it is carrying, a pair of clamping jaws are in position to receive the condenser which is discharged therefrom. Thus as the motor 4 continues to operate, a series of condensers will be transmitted by the continuous carrier and will be clamped in test positions about the periphery of the rotating insulated disc 6.

The condensers will therefore be taken slowly around in an arcuate path to different test positions and tested for various properties thereof. There are in this instance two tests which are made: the first for short circuit or leak, and the second to test as to whether the capacity falls within certain preset tolerance limits. At various positions in the rotation of the test disc there are provided means for releasing the condenser if it does not fulfill the requirements of that test, and these are in the form of solenoids such as 50 or 52 as shown in Figure 1, which, when energized, assume a position which wil cause the lever 28 of the assembly being tested to force out the clamping jaws 26 and release the condenser at the point. Thus, if the condenser is found to be shorted or leaking, it will be released at one point, or if it falls outside of the capacity tolerances, will be discharged at another point. If it passes all of the required tests, it comes to a position where the release bar 28 thereof engages a small roller 56 on the frame which is substantially the same as the roller 48, which roller depresses the lever 28 and causes the condenser to be discharged into a chute 58 for good condensers. This last discharge position is shown in detail in Figure 3 and is the position shown in dotted lines on Figure 4 at the lower right-hand portion of the device.

Referring now particularly to Figure 5, the circuit diagram of the device, we find therein a plug 60 to which is connected a suitable source of alternating current. One side of this plug is connected by line 62 to a transformer primary 64 and also to a second transformer primary 66. In series with the first transformer primary is a variable resistance 68, the opposite side of which is connected to ground. The secondary of the transformer just mentioned is split and forms two portions 70 and 72, both terminals of windings of the secondary 70 being connected to the cathode 74 of a rectifier tube and the terminals of the second secondary winding 72 being respectively connected to anodes 76 and 78 of the same rectifier tube, the center point of the secondary winding 72 being connected to ground.

The center point of the secondary 70 is connected by line 80 to a filter 82 and thence by line 84 to a pair of voltage dividers 86 and 88 which have a plurality of contactors thereon to supply voltages of 200, 400, 600 or 800. Of course these are only exemplary and any desired voltage may be applied by the adjustment on the voltage supply. The movable contact 90 of the voltage divider 86 is connected through a high resistance 92 to line 94 to a voltmeter 96 and also to one contact 98 which is adapted to wipe over the arcuate contact 20 of the particular clamping assembly in that test position at the time. There is also provided a contact 100 which is connected to ground and is adapted to wipe over the associated arcuate conductive contact 19 of the assembly. The opposite side of the voltmeter 96 is also connected to ground.

The said voltage divider 88 has its movable or adjustable contact 102 connected to a high resistance 104 and through line 106 to a wiping contact 110 in a second test position. The associated wiper contact 108 thereof is connected to line 112 and thus to a fuse 114, the opposite side of which is connected to coil 116 of a very sensitive relay, the opposite end of the coil being connected to ground and also to the movable relay member 118 which cooperates with a stationary contact 120 connected through line 122 to a power relay 124 which is connected through line 126 to one side of the secondary 128 of the second transformer associated with line 62. Line 126 also extends to coil 130 of a timing relay, the opposite terminal of which is connected by line 132 to terminal 134 adjacent the lower portion of the rotating disc. In close proximity to terminal 134 is a second stationary wiper terminal 136 which is connected directly to ground.

The secondary 128 of the transformer just mentioned provides power to an amplifier through having the upper terminal of the secondary connected through line 138 to plate 140 and having a tap thereon connected through line 142 to the filament 144, the opposite side of which is connected through line 146 to line 126 and thus to the lower end of the secondary 128. An indirectly heated pair of cathodes 148 and 150 are connected to ground, the former being connected through condenser 152, also to the line 126. A second plate 154 of this amplifier tube is connected by line 156 to a power relay 158, the opposite side of which is connected by line 160 to one of the contacts of the voltage divider 88. A negative bias resistance 162 is connected between line 126 and one of the control grids 164 of the tube. The second grid 166 is connected by line 169 to line 160 just mentioned.

The energization of either of the power relays 124 or 158 will close their associated switches 168 and 170 to operate the ejection solenoids 52 and 50. The initial actuation of either of these ejection solenoids closes a micro-switch 171 or 172 to maintain the ejection circuit closed a sufficient length of time and prevent chattering. Both the micro-switches 171 and 172 are connected to line 174 which extends to contact 176 of the timing relay. The opposite side of the switch 176 is connected through line 178 directly with the incoming line 62.

The grid 164 of the amplifier tube is connected by line 180 to two spaced contacts 182 and 184 of a D. C. meter 186. The movable contact 188 of the meter 186 floats between the two stationary contacts and is connected to ground through line 190. The actuating coil 192 of the meter has one end connected to line 212 and the opposite end connected through line 194 to one D. C. terminal 196 of a rectifier 198 which may as an example be of the bridge type. A second A. C. terminal 200 of the rectifier 198 is connected by line 202 to a movable blade 204 of a double-pole, double-throw knife switch, the other movable blade 208 being connected by line 206 to main supply line 62.

A third D. C. rectifier contact 210 is connected by line 212 to the coil 192 and a fourth A. C. rectifier contact 214 is connected to fuse 216 and then to the secondary winding 218 of an impedance matching isolation transformer by line 220. The opposite terminal of the winding 218 is connected by line 222 to ground. A variable resistance 224 is connected across the winding 218 and is provided with a switch 226 so that it may be placed in shunt to the transformer winding or out entirely, as desired. The primary winding 228 of the impedance matching transformer has one terminal connected to ground and the opposite terminal connected to one terminal of a voltage doubling transformer 230 by line 232. The opposite terminal of the voltage doubling transformer is connected to ground. The center tap 234 on the transformer 230 is connected by line 236 to the movable member 240 of a voltage varying device 238, said device 238 being connected by line 242 to a voltage regulator 244 which is connected across the supply line.

The opposite side of the supply line is connected directly to the motor 4 which is also connected to a stationary contact 246 of the double-pole, double-throw switch. A standard condenser 248 is connected between another of the switch's terminals 250 and ground. A discharging resistor 252 is connected between two terminals 254 and 256 adjacent the drum.

It will thus be obvious from the previous discussion that there are several positions at which the electrodes clamping the condenser being tested are connected to various portions of the test apparatus. When the disc carrying a condenser to be tested has reached position A, a voltage is applied thereto of a desired value, depending upon the condenser to be tested, to charge said condenser. This charge therefore remains on the condenser (if it is satisfactory) until the condenser reaches test point B at which point the charge upon the condenser is measured and if it falls outside of certain limits the ejector solenoid will be energized and the condenser physically released from the clamps. If, on the other hand, it is satisfactory, it will proceed to test point C, at which point it will be discharged through a load resistor. It then proceeds to testing point D, at which point A. C. current is supplied thereto to measure the capacity. If the capacity thereof falls between preset high and low limits, it then passes on to a discharge point.

With this general discussion, therefore, let us trace through the actual operation of the device. As previously mentioned, the condenser is fed into the slots by the endless conveyor which meets each one of the test positions on the rotating vehicle disc and the condenser is then rotated about a horizontal axis by the motor 4. When it reaches test position A it is conductively secured between stationary contacts 98 and 100. Prior to this time the apparatus has been set to accommodate this particular type of condenser and the movable arms 90 and 102 of the voltage divider have been set for the particular voltage upon which this condenser is designed to operate. This voltage is therefore supplied to the condenser at test point A. The transformer 64, 72, 70 is capable of providing 1100 volts at 100 milliamperes each side of the center tap. The rheostat 68 is used to adjust the primary voltage so that there is exactly 1000 volts D. C. supplied by the rectifying tube 74, 76, 78 and the filter choke 82 to the voltage divider 86 and 88. This of course may be any particular value, the amounts cited herein being only exemplary of a satisfactory supply for a large number of different types of condensers. The voltage dividers have four adjustable taps and in this instance are capable of supplying 200–400–600 and 800 volts, respectively, to the adjustable contact 90 or 102, as desired. The voltage applied to this movable member 90 then passes through an isolating resistor 92 and may be read on the voltmeter 96. It is also applied to the terminal 98 which as before mentioned is adapted to contact one terminal of the clamping member for the condenser to be tested. The other terminal 100 is, as shown, connected to ground. Thus when the condenser reaches test point A a desired voltage of, let us say 200 volts, is applied thereto.

The large disc continues to rotate and the condenser therefore is removed from contact with the supply and during the length of time necessary for the disc to be rotated from point A to point B the condenser should retain its charge. If there is a leak or short therein the charge will become smaller before the condenser has reached test point B. Test point B is supplied with power in exactly the same manner as test point A, only this time through the voltage divider 88, the amount being set by the position of the adjustable arm 102. This voltage as before is applied through an isolating resistor to prevent direct short circuit. This source of power is connected to stationary terminal 108 at test point B, the opposite terminal 110 being connected through a fuse and operating coil 116 of a meter 118 to ground. If the condenser is satisfactory and has remained in its charged state, when it reaches test position B and has again applied thereto a voltage identical to that already applied at point A there will be no appreciable flow of current and the switch 118—120 will remain open, as shown.

However, if the condenser is shorted or leaky, then there will be a substantial flow of current from the voltage divider 88 through the condenser and through operating coil 116 to ground. This will cause switch 118—120 to close and this closure will operate a power relay 124 through an obvious circuit from the secondary 128 to ground through switch 118—120. Closure of this power relay will in turn cause the switch 168 to close which will energize the ejector relay 52 through the following circuit: From supply line 178, through switch 176, line 174, switch 168, solenoid 52 to ground. Upon very slight movement of the ejector relay a holding circuit through microswitch 171 is set up, shunting the switch 168 so that the solenoid will remain in ejecting position for a given time and will not chatter. This circuit is through lines 258 to switch 171 and then from there through line 260 to the end of the solenoid coil. This shunts switch 168.

There therefore only remains in the supply circuit the switch 176 which is operated by a timing relay 130. This timing relay is not operated until the end of that portion of the test cycle and this occurs when the two contacts 134 and 136 ride off the same contacting bar 20 on the dial 6 which is adjacent the contacts at that time. At this time the relay 130 is deenergized and the switch 176 opened to bring any one of the operated ejector solenoids back to its deenergized position. It might be stated at this point that the arcuate distance between articles to be tested is sufficient to be greater than the distance between test positions B and D so that the solenoid 52 will always be deenergized upon the approach of a new condenser to be tested.

If the condenser is not shorted, it passes test point B satisfactorily, the solenoid 52 is not operated to cause its ejection and arrives at test point C where it is directly shunted by a load resistor 252 which allows the condenser to discharge slowly to prevent any damage.

It then passes on to test point D and it will be noted that one side of the condenser is connected directly to ground through terminals 134, 136 (which are together) and the other is connected to switch 204—208 which is as before stated a double-pole, double-throw switch. When this switch is in its downward position the motor M is deenergized, which motor runs the transporting means, and the opposite side 204 connects a standard condenser 248 of the type to be tested to the testing equipment. When the switch is in its uppermost position the motor is energized and also the condenser being tested is connected to this portion of the test equipment.

For this particular test a voltage regulator 244 is utilized to provide a substantially constant voltage and to accommodate any change in line voltage. A variable voltage device 238 is also utilized and by moving the movable arm 240 any voltage from substantially zero to, in this instance 270 volts, may be supplied to the line 236. An autotransformer 230 is used also to double the voltage supplied from the variable voltage supply. These various parts are merely included so that the device will accommodate a large range of capacities in condensers to be tested. If only one type were to be tested, it would not be necessary to utilize this equipment. The transformer 218—228 is used as an isolating and impedance matching transformer and here again the value may be altered by having the shunting resistance 224 across the secondary 218, which adjustment is used as a micro-adjustment on higher capacity condensers.

The rectifier 196—200—210—214 passes D. C. current in direct proportion to the capacity of the condenser to the operating meter movement 192 since the capacity determines the A. C. current flow through the rectifier circuit and therefore the proportional D. C. component. This coil 192 with its associated indicating needle is adjusted so that with the normal current flow through the condenser the needle 188 will lie between the two stationary contacts 182 or 184, the distance between the two being adjustable and being preset to cover the tolerance range of the condenser. The condenser 272 is utilized to filter the D. C. current to prevent chattering in the meter movement. With the standard condenser 248 in place and switch 204, 208 down, variable voltage supply 238 and rheostat 224 are so adjusted that the contact for 188 on the meter 186 is on mid-scale. The contacts 182 and 184 are set to the high and low percentage tolerance marks for this type of condenser, as before mentioned. The scale of this meter is calibrated at zero percent in mid-scale and from zero to plus 100% on one side and to minus 100% on the other side.

The switch 204, 208 is then thrown up to place the condenser under test, which now lies at test point D in the circuit, by applying it directly in the A. C. series circuit of the rectifier. If the condenser is outside its percentage tolerance or capacity, the D. C. current through coil 192 will be above or below the standard and contact is made between movable arm 188 and, let us say, stationary contact 184. This removes the voltage from the grid 164 of the amplifier tube, causing electron flow through the plate 154 of this tube, which in turn causes flow in the circuit containing the relay coil 158. The trigger action of the amplifier in this case gives a very sensitive response. This causes switch 170 to close, which energizes ejector solenoid 50 in exactly the same way and from the same source of supply as ejector solenoid 52. Likewise, in this case the mechanical movement of the solenoid armature causes closure of a micro-switch 172, establishing a shunt circuit around the switch 170 to maintain the solenoid 50 in its ejecting position until the timing relay 130 is deenergized by the circuit being broken between points 134 and 136.

If the condenser is satisfactory, however, and the movable armature 188 does not contact either 182 or 184, the ejector relay 50 is not operated and the condenser passes on to be mechanically ejected by a cam 56 at a point some distance after test point D. It will thus be obvious from an examination of the above that the various tapped resistors and adjustable means make it possible to test a large number of different varieties of condensers and that once the mechanisms have been adjusted that type of condenser may be tested with great rapidity, it only being necessary to feed the same to the conveyor belt and they then are automatically brought through the test positions and ejected at the proper point.

I claim:

1. In a device for testing condensers, movable means for moving said condensers along a predetermined path past a series of test positions, a source of adjustable regulated alternating current connected to a test position, a rectifier connected thereto, a balanced meter relay connected to the rectifier whereby the A. C. current flow through a condenser is measured, a pair of spaced contacts, one on each side of the balanced relay arm, electronic means normally biased to cut off, selective means to classify the condensers controlled by said electronic means and means connecting the electronic means to the spaced contacts to vary the bias on the electronic means and control the operation of the selective means.

2. In a device for testing condensers, movable means for moving said condensers along a predetermined path past a series of test positions, a source of adjustable regulated alternating current connected to a test position, a rectifier connected thereto, a balanced meter relay connected to the rectifier whereby the A. C. current flow through a condenser is measured by the D. C. proportionate current to the relay, a pair of spaced contacts one on each side of the balanced relay arm and ejection means controlled by either of said contacts to cause the condenser to be removed from the moving means.

3. In a device for testing condensers, movable means for moving said condensers along a predetermined path past a series of test positions, a source of adjustable regulated alternating current connected to a test position, a rectifier connected thereto, a balanced meter relay connected to the rectifier whereby the A. C. current flow through a condenser is measured, a pair of spaced contacts one on each side of the balanced relay arm, a multi-electrode amplifier tube normally biased to prevent flow therethrough, said biasing means being connected to the spaced contacts, ejection means to cause removal of a condenser from the movable means, another electrode of said amplifier connected to said ejection means and controlling the operation thereof whereby when contact is made between the contacts and the relay arm the bias is removed from the tube and the ejector is actuated.

4. In a device for testing condensers, movable means for moving said condensers along a predetermined path past a series of test positions, a source of adjustable regulated alternating current connected to a test position, a rectifier connected thereto, a balanced meter relay connected to the rectifier whereby the flow through the condenser is measured, a pair of spaced contacts one on each side of the balanced relay arm, ejection means controlled by either of said contacts to cause the condenser to be removed from the moving means, and locking means to maintain said ejection means in ejecting position until the end of the test cycle.

5. In a device for testing condensers, movable means for moving said condensers along a predetermined path past a series of test positions, a source of adjustable regulated alternating current connected to a test position, a rectifier connected thereto, a balanced meter relay connected to the rectifier whereby the flow through the condenser is measured, a pair of spaced contacts one on each side of the balanced relay arm representing high and low tolerances, condenser means connected across the relay to prevent chatter thereof, and ejection means controlled by said contacts to cause the condenser to be removed from the moving means.

6. In a device for testing condensers, movable means for moving said condensers along a predetermined path past a series of test positions, a source of adjustable regulated alternating current connected to a test position, a rectifier connected thereto, a balanced meter relay connected to the rectifier whereby the flow through the condenser is measured, a pair of spaced contacts one on each side of the balanced relay arm representing high and low tolerances, ejection means controlled by said contacts to cause the condenser to be removed from the moving means, and locking means for the ejecting means to maintain the same energized until the test position has been passed.

7. In a device for testing condensers, movable means for moving said condensers along a predetermined path past a series of test positions, a source of adjustable regulated alternating current connected to a test position, a rectifier connected thereto, a balanced meter relay connected to the rectifier whereby the flow through the condenser is measured, a pair of spaced contacts one on each side of the balanced relay arm representing high and low tolerances, a multi-electrode amplifier tube normally biased to prevent flow therethrough, said biasing means being connected to the spaced contacts, ejection means to cause removal of a condenser from the movable means, another electrode of said amplifier connected to said ejection means and controlling the operation thereof whereby when contact is made between the contacts and the relay arm the bias is removed from the tube and the ejector is actuated, and locking means for the ejecting means to maintain the same energized until the test position has been entirely passed.

MARTIN W. GAISER.